United States Patent [19]
Ignacio

[11] Patent Number: 6,167,076
[45] Date of Patent: Dec. 26, 2000

[54] ELECTRODE WRENCH

[75] Inventor: Rey Mupas Ignacio, Goose Creek, N.C.

[73] Assignee: Nucor Corporation, Charlotte, N.C.

[21] Appl. No.: 09/527,005

[22] Filed: Mar. 16, 2000

[51] Int. Cl.$^7$ ..................................................... H05B 7/14
[52] U.S. Cl. ............................................. 373/92; 373/100
[58] Field of Search ................................. 373/92, 94, 100, 373/51, 52; 285/31, 36, 18, 390, 421; 403/DIG. 5

[56] References Cited

U.S. PATENT DOCUMENTS

| | | | |
|---|---|---|---|
| 3,796,818 | 3/1974 | Yuasa et al. | 373/92 |
| 4,185,158 | 1/1980 | Koga et al. | 373/75 |
| 4,400,815 | 8/1983 | Dunn et al. | 373/92 |
| 4,420,838 | 12/1983 | Dunn et al. | 373/91 |
| 4,665,530 | 5/1987 | Corbethau | 373/92 |
| 4,736,384 | 4/1988 | Sakai et al. | 373/92 |
| 5,638,398 | 6/1997 | Ikitsu et al. | 373/92 |
| 5,757,841 | 5/1998 | Ikitsu et al. | 373/92 |

OTHER PUBLICATIONS

"The Modern Arc Furnace In Steel Mill and Foundry," Electric Arc Furnace Electrode Digest, Union Carbide Corporation, No. 2, 1975.
"The Arc Furnace Secondary Power Circuit," Electric Arc Furnace Electrode Digest, Union Carbide Corporation, No. 6, 1976.
"Arc Furnace Instruments and Controls," Electric Arc Furnace Electrode Digest, Union Carbide Corporation, No. 7, 1976.
"The Arc Furnace Electrode," Electric Arc Furnace Electrode Digest, Union Carbide Corporation, No. 8, 1976.
"Electrode Additions," Electric Arc Furnace Electrode Digest, Union Carbide Corporation, No. 11, 1976.
"Electrode Consumption," Electric Arc Furnace Electrode Digest, Union Carbide Corporation, No. 15, 1977.
"Arc Furnace Practices and Electrode Performance," Electric Arc Furnace Electrode Digest, Union Carbide Corporation, No. 17, 1977.
"The Electrode Tip In Arc Melting," Electric Arc Furnace Electrode Digest, Union Carbide Corporation, No. 18, 1977.

*Primary Examiner*—Tu Ba Hoang
*Attorney, Agent, or Firm*—Moore & Van Allen, PLLC; Matthew W. Witsil; Dominic J. Chiantera

[57] ABSTRACT

An apparatus for joining a threaded free electrode section with a threaded fixed electrode section for use in electric arc furnaces. The apparatus comprises a driver and a coupler with a plurality of pawls to grip the free electrode section and turn it in one direction. After the driver and coupler pass through a range of motion causing the free electrode to turn in the same direction, they reverse direction, with the pawls releasing the free electrode so that the free electrode does not reverse direction, and the driver and coupler return to the original position in a ratchet-like action.

13 Claims, 8 Drawing Sheets

ELECTRODE WRENCH

TECHNICAL FIELD

The present invention relates to the field of electric arc furnaces, and more particularly to apparatus used to install electrodes in electric arc furnaces.

BACKGROUND ART

As known, electric arc furnaces used for producing molten metal from metal scrap have one or more electrodes that generate an electric arc from the electrode end to the materials placed in the furnace. The electrode is disposed vertically with respect to the furnace by mounting apparatus and extends downwardly into the furnace through a hole in the roof. The upper end of the electrode is electrically connected to a voltage source, and in operation the electrode emits an electrical arc from its oven end (or anode) to the scrap material thereby creating the energy to melt the scrap.

The electrode material is a form of graphite that is provided in solid cylindrical sections. The electrode sections range in diameter from approximately 8-inches to 30-inches and in length from approximately 5-feet to 10-feet, with weight up to approximately 4.500 pounds. Electrode sections have internally threaded ends to allow them to be screwed together using a threaded nipple with external threads. The threaded nipples are also solid graphite. As the electrode operates, the bottom of the electrode is consumed in the furnace, and periodically the furnace is shut down so that a new electrode section may be added onto the end of the electrode that protrudes from the furnace. The remaining electrode is then lowered into the operating position in the furnace that was vacated by the consumed electrode.

FIG. 1 is a figurative prior art illustration of a new electrode section 12 that is in position to be added to a fixed, mounted electrode 16. An electrode holder 14 secures the mounted electrode 16 in position so that it extends through a hole in the electric arc furnace roof 18. The electrode section 12 is vertically suspended by a crane, not shown, that is hooked onto a threaded stem lift plug 20 attached to the upper end of the electrode section 12 that is held over the fixed, mounted electrode 16. The externally threaded nipple 21 is installed in the bottom of the electrode section 12. Operators access the electrode section 12 by either standing on the electrode holder 14 or on a catwalk 22. Once the electrode sections 12, 16 are joined, the electrode holder 14 releases the fixed electrode section 16 and the crane lowers the electrode into position in the furnace. The electrode holder 14 is then tightened to hold the added electrode section 12, and the crane releases the electrode.

Among the known methods for installing of the new electrode section 12 to the electrode section 16 already installed in the furnace is to use manual tools. A manual tool commonly used is a chain wrench, which is a chain that is tightly wrapped around the free electrode body one time, with both ends of the chain fastened to a handle. The chain grasps the electrode when the handle is pulled and the free electrode is threaded into the female connector 23 of the installed electrode 16. Manual tightening of the electrode section to the specified torque is difficult.

Both mechanical integrity and electrical continuity are critical at each joint of the electrode. There is a risk of breakage of the free electrode section that can result from the attempt to reach the specified torque or from making the connection too tight, and the electrode sections are very expensive. If the connection is too loose, breakage can result from a bad connection that allows the electrodes to swing and break. Thread damage can occur from overtightening as well as from undertightening, when excessive heat builds up as a result of increased resistance and electric arcing occurs across a gap in the threads at a poor connection. Each socket of the electrode sections must be blown clean with a compressed air hose to eliminate any particles that could cause the joint to fail because of increased electrical resistance, which in turn promotes overheating, waste of power, and breakage of the connecting nipple.

The manual equipment requires from two to three people to operate it for a period ranging from twelve to fifteen minutes. Typically, an electrode section must be added for each 8 to 12-hour shift. The operators are in a less than totally safe environment when installing a new electrode section because of the difficulty involved in using the equipment on a platform in the hot and dusty area above the furnace for extended time. The extended time required for the furnace to be shut down is also undesirable.

In summary, the known manual methods for tightening the electrode sections require excessive furnace downtime and too many people to perform the operation, and it is difficult to tighten to the specified torque.

DISCLOSURE OF INVENTION

One object of the present invention is to provide apparatus which is capable of reliably and rapidly screwing the electrode sections together. It is another object of the present invention to provide apparatus that may be safely operated by one operator, without the use of expensive and complex equipment. Still another object of the invention is to provide apparatus that may be used to add electrodes and avoid breakage of electrodes while tightening the electrodes to the proper torque.

According to the present invention, electrode wrench apparatus comprises a housing adapted to encircle the new electrode section as it is placed in proximate registration with the exposed end of the installed electrode, the housing including a driver member having a handle which may be moved in reciprocating fashion by an operator over a range of motion, from a fully retracted position to a fully extended position, the driver member further including a plurality of pawls positioned in proximity to the encircled electrode section, each pawl being adapted for pivotal movement, inward and outward in response to reciprocating motion of the handle between the fully extended position and the fully retracted position, the plurality of pawls engaging the electrode while pivoted inward and disengaging the electrode while pivoted outward, whereby the new electrode section may be threaded into the installed electrode section in a ratchet-like fashion.

In further accord with the present invention the handle is adapted to receive a motive force, from a source of motive power capable of extending the handle from the fully retracted position to the fully extended position at a controlled torque thereby permitting the handle to be moved in the reciprocating manner, alternately, by the operator and by the source of motive force. In still further accord with the present invention the source of motive force may be selectably actuated by the operator. In yet still further accord with the present invention, the controlled torque value is selectable by the operator.

The present electrode wrench, with the reciprocating motion of its drive handle and the ratchet-like motion provided by the pivoting action of the plurality of pawls, permits an ease of operation, while assuring proper threading of the new section to the installed electrode. A single operator can operate the apparatus. Similarly, a supplemental drive force, such as a pneumatic cylinder or other means, may be releasably connected to the driver arm to assist the operator in achieving the specified torque.

These and other objects, features, and advantages of the present invention will become more apparent in light of the following detailed description of a best mode embodiment thereof, as illustrated in the accompanying Drawings.

BRIEF DESCRIPTION OF DRAWINGS

FIG. 6 shows a sectional view of the housing of the apparatus as taken along line A—A in FIG. 5a.

BEST MODE FOR CARRYING OUT THE INVENTION

The present invention is directed to apparatus for use by an operator in tightening the threaded mounting end of an axially extended, substantially cylindrical, free electrode section, to the threaded receiving end of a mounted electrode section. The apparatus does this by gripping the electrode section and causing it to turn with a driver that travels through a range of motion, releasing the electrode in a ratchet-like manner at the end of the driver's range of motion and the driver then returning to its original position.

The apparatus of the present invention permits a single operator to join electrode sections without the use of expensive and complex equipment. A single operator can screw the new electrode section to the fixed electrode section in two to three minutes. The present invention also eliminates the limitations of prior apparatus that were unable to achieve the specified torque.

Figure 1:
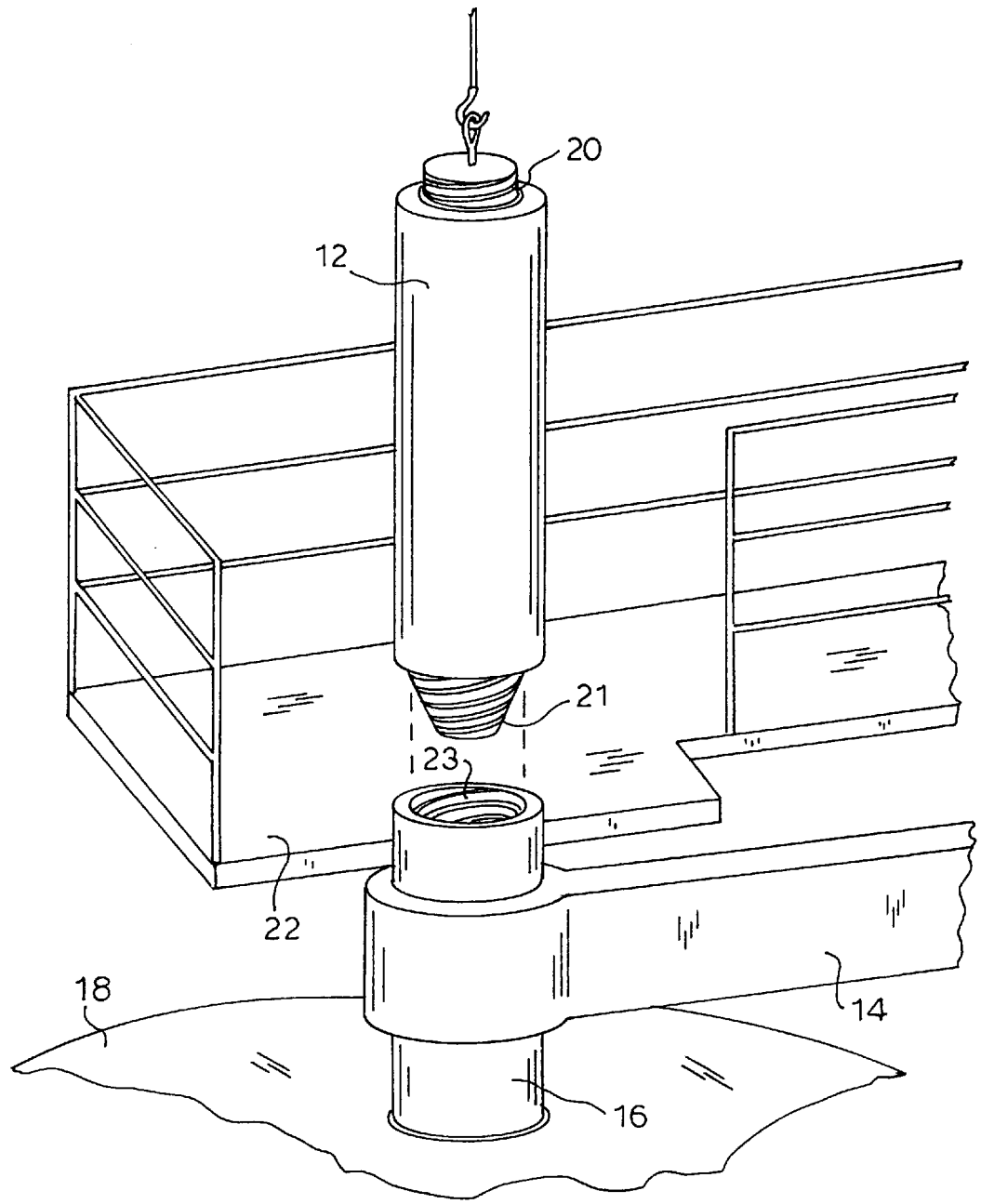
FIG. 1 is a figurative representation illustrating a new electrode section in position to be added to a fixed, mounted electrode section.
Figure 2:
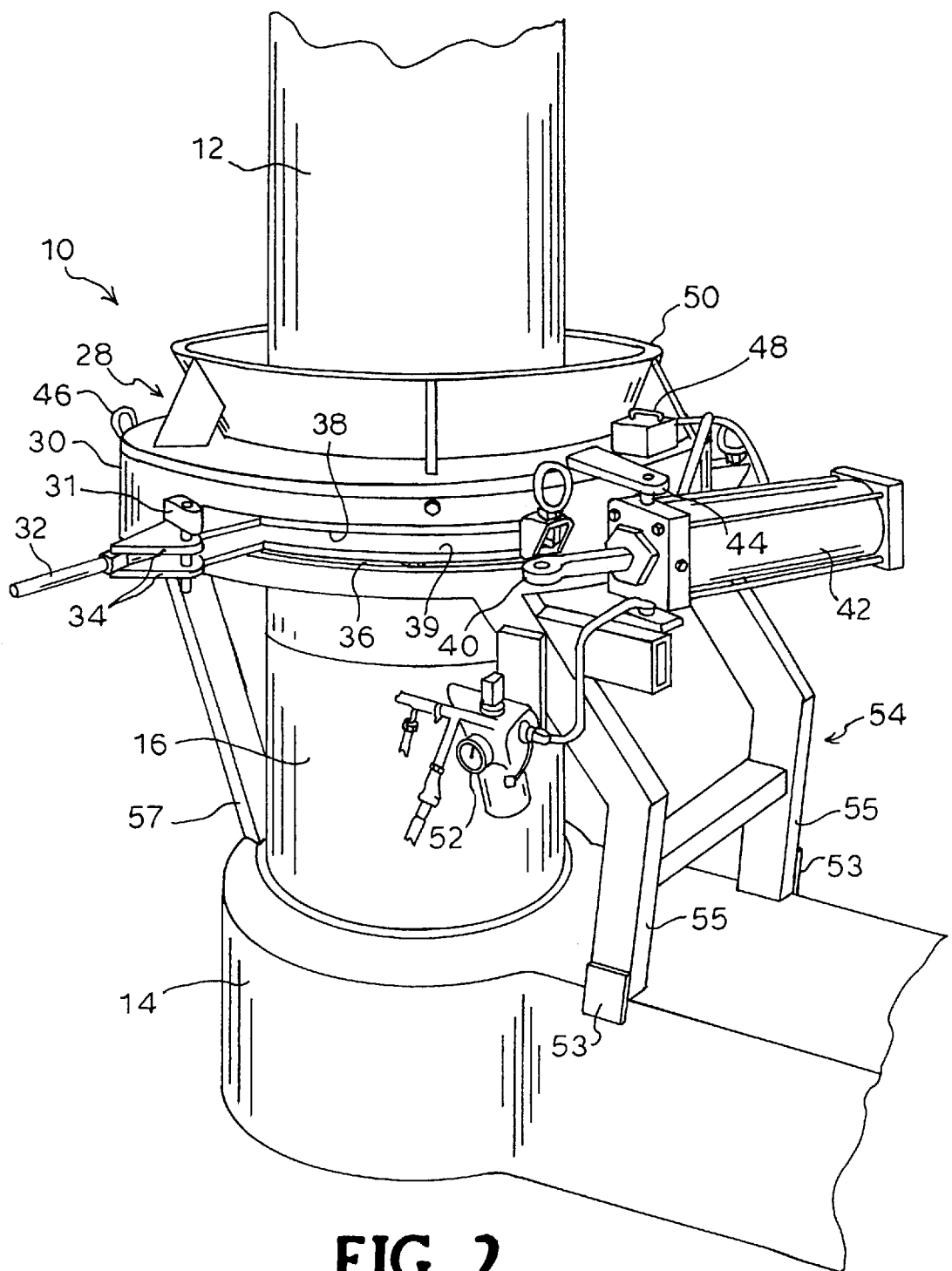
FIG. 2 is a perspective view of the apparatus with the electrode sections of FIG. 1.

FIG. 2 shows a perspective view of the apparatus 10. A crane lifts the apparatus 10 into position on the electrode holder 14 using lifting eyes 46. The new electrode section 12 is lifted into position above the fixed electrode section 16, where the threads of both the electrode section 12 and the fixed electrode section 16 are cleaned, preferably with the use of a compressed air hose that blows debris off of the threads. The electrode section 12 is then lowered through the apparatus 10 to within an inch or two of the fixed electrode section 16. The threaded stem in the threaded stem lift plug 20 that is shown in FIG. 1 has the same pitch as the threads of the threaded nipple 21, also shown in FIG. 1, and the threaded receiving end 23 of the fixed electrode section 16. The electrode section 12 can therefor be turned into the lower socket without having to turn the hook of the crane. The apparatus 10 is used to turn the electrode section 12 and connect it to the fixed electrode section 16. An operator accesses the apparatus 10 by standing on the catwalk 22 (shown in FIG. 1).

The apparatus 10 comprises a wrench 28, a stand 54, and driver arms 34. The top 50 serves as a guide for "steering" the end of the electrode section 12 into the center portion of the wrench 28. The driver arms 34 extend through the slot 36 in the housing 30. A handle 32 is provided for manual operation of the apparatus 10. The housing 30 rests on a stand 54. The legs 55, 57 of the stand 54 rest on the electrode holder 14. There are three plates 53 fastened to the legs 55, 57, two of which are shown on the legs 55. The two plates 53 that are shown extend on the outside of each leg 55 to fix the apparatus 10 in position. The third plate 53, not shown is fastened to the third leg 57, and extends in between the leg 57 and the electrode 16 to fix the apparatus in position along the electrode arm 14. The pneumatic cylinder 42 is held by the pneumatic cylinder support 44, and is controlled by an electrical switch 48. A pressure gauge 52 controls the pressure in the pneumatic cylinder. The pin 31 may be inserted in the eye at the end of the pneumatic cylinder piston 40 to connect the driver arms 31 to the pneumatic cylinder 42.

Figure 3:
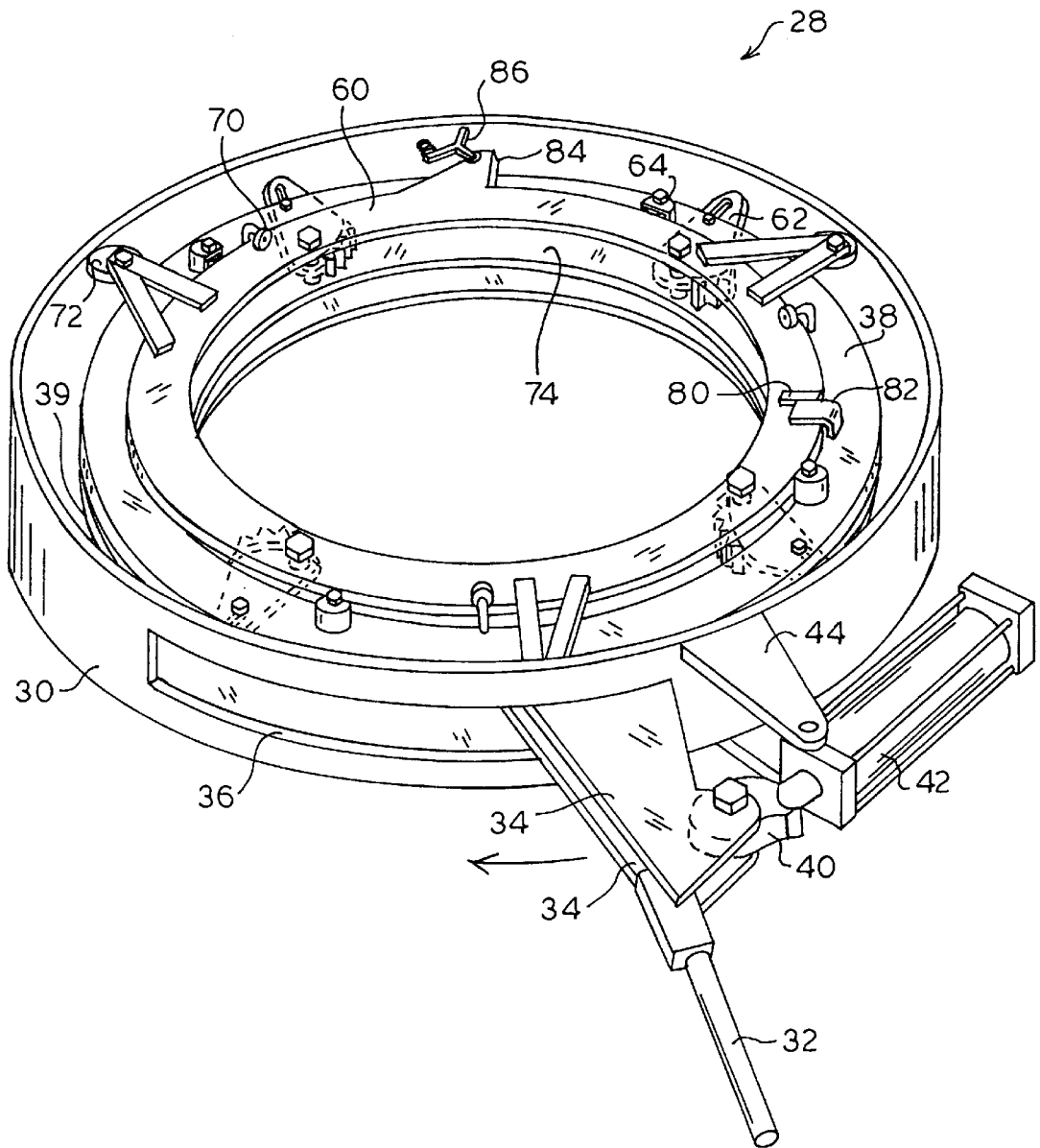
FIG. 3 is a perspective view of the housing of the apparatus of FIG. 2 with the top and selected features removed.

FIG. 3 shows a perspective view of the wrench 28 with the top 50 removed and other selected features not shown. Tile driver comprises two driver members 38, 39 (39 not visible). The coupler comprises two coupler members 60, 74 and four pawls 62. The coupler is horizontally positioned within the housing 30 by the coupler centering bearings 72. Unless otherwise noted, the preferred bearings are needle bearings. The driver is horizontally positioned within the housing by maintaining a constant distance from the coupler with the driver centering bearings 64, attached to the top driver member 38. The driver is vertically positioned by the driver vertical bearings 70 that ride along the top surface of the top coupler element 60.

The driver is shown in its retracted position, with the driver arms 34 fully to the right in the slot 36 in the housing 30. A hole in the driver arms 34 matches up with a hole at the end of the piston 40 through which a pin may be inserted to connect the piston 40 and pneumatic cylinder 42 or other mechanical means for applying force to the driver arms 34. The pneumatic cylinder 42 is held by a support 44. The top coupler member 60 has a stop 84 extending from its outer diameter with a notch into which a lock 86 initially fits. A return finger 82 is attached to the top driver member 38 and is initially adjacent to a return block 80 that is attached to the top coupler member 60.

Figure 7:
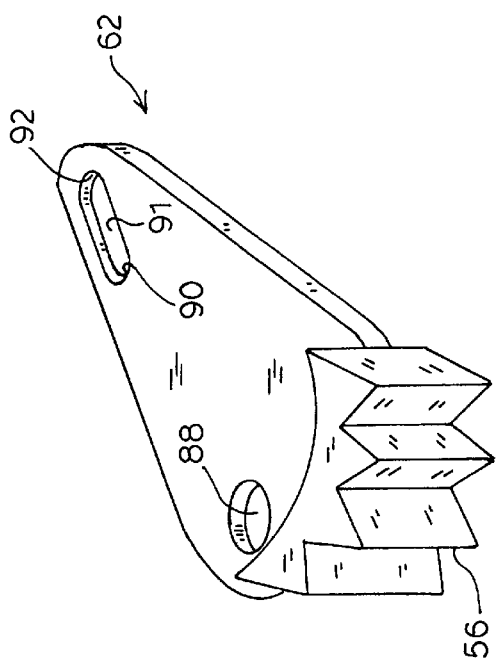
FIG. 7 shows a detail of a pawl as shown in FIGS. 3 through 6.

FIG. 7 shows a pawl 62, with a gripping face 56 and two voids. One void is a hole 88 that serves as a pivot point for the pawl, and the other void is a slot 91. The slot 91 has one end that is proximate 90 to the pivot point hole 88 and another end distal 92 to the pivot point hole 88.

Figure 4:
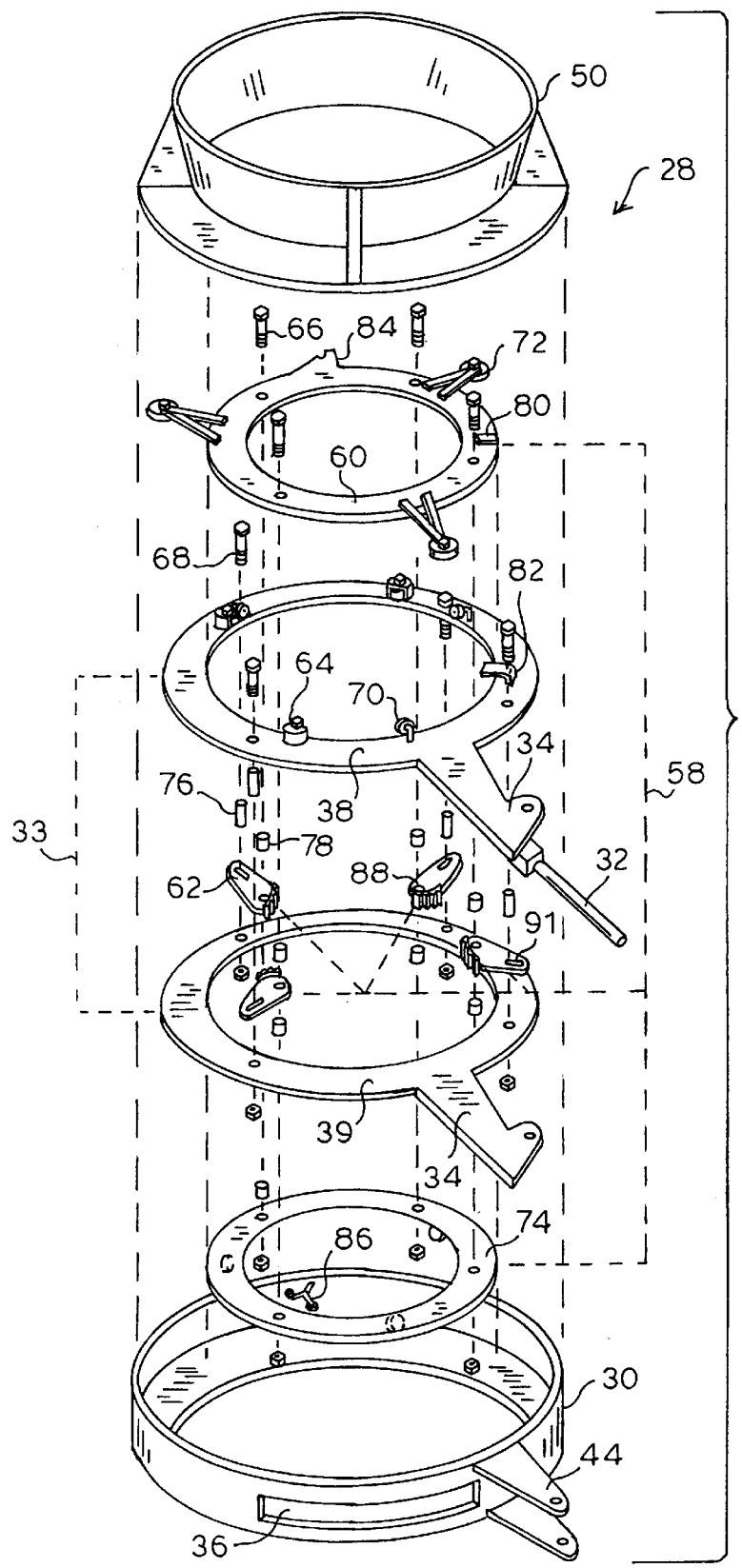
FIG. 4 :is an exploded view of the housing and its contents of the apparatus of FIG. 2.

FIG. 4 shows an exploded view of the wrench 28. The coupler 58 comprises a plurality of pawls 62 and coupler members 60, 74 fastened together with coupler pins 66 through the hole 88 in each pawl 62, preferably with taper bearings 78 in each hole 88. The driver 33 comprises driver members 38, 39 fastened together with driver pins 68 through the slot 91 in each pawl, preferably with needle bearings 76 in each slot 91. Spacers (not shown) are installed around the bolts 66, 68 as required to act in conjunction with the bearings 76, 78 to keep the rings 60, 38, 39, 74 in proper spaced relation. FIG. 6 is a section view taken along the line A—A in FIG. 5a. The driver members 38, 39 are between the coupler members 60, 74. The driver arms 34 extend through the slot 36 in the housing 30. The driver vertical bearing 70 and the driver centering bearing 64 maintain the position of the driver members 38, 39. The coupler vertical bearings 94 of which there are three (two not visible) are welded to the bottom coupler member 74 and ride along the bottom surface of the housing 30.

Figure 5A:
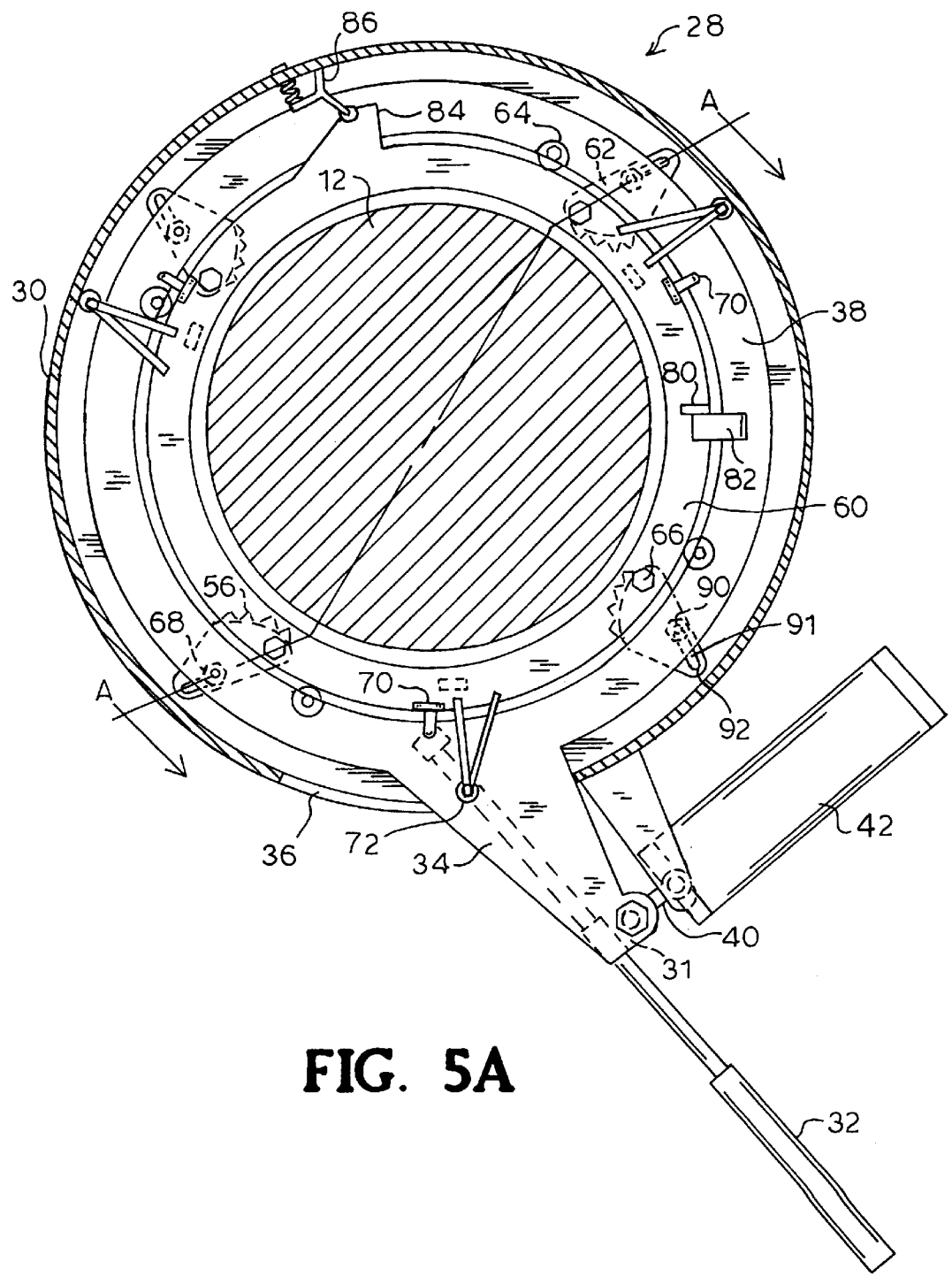
FIGS. 5a, 5b, and 5c are top views of the housing and its contents of the apparatus of FIG. 2 showing the apparatus in the retracted, partially extended, and fully extended positions respectively.
Figure 5B:
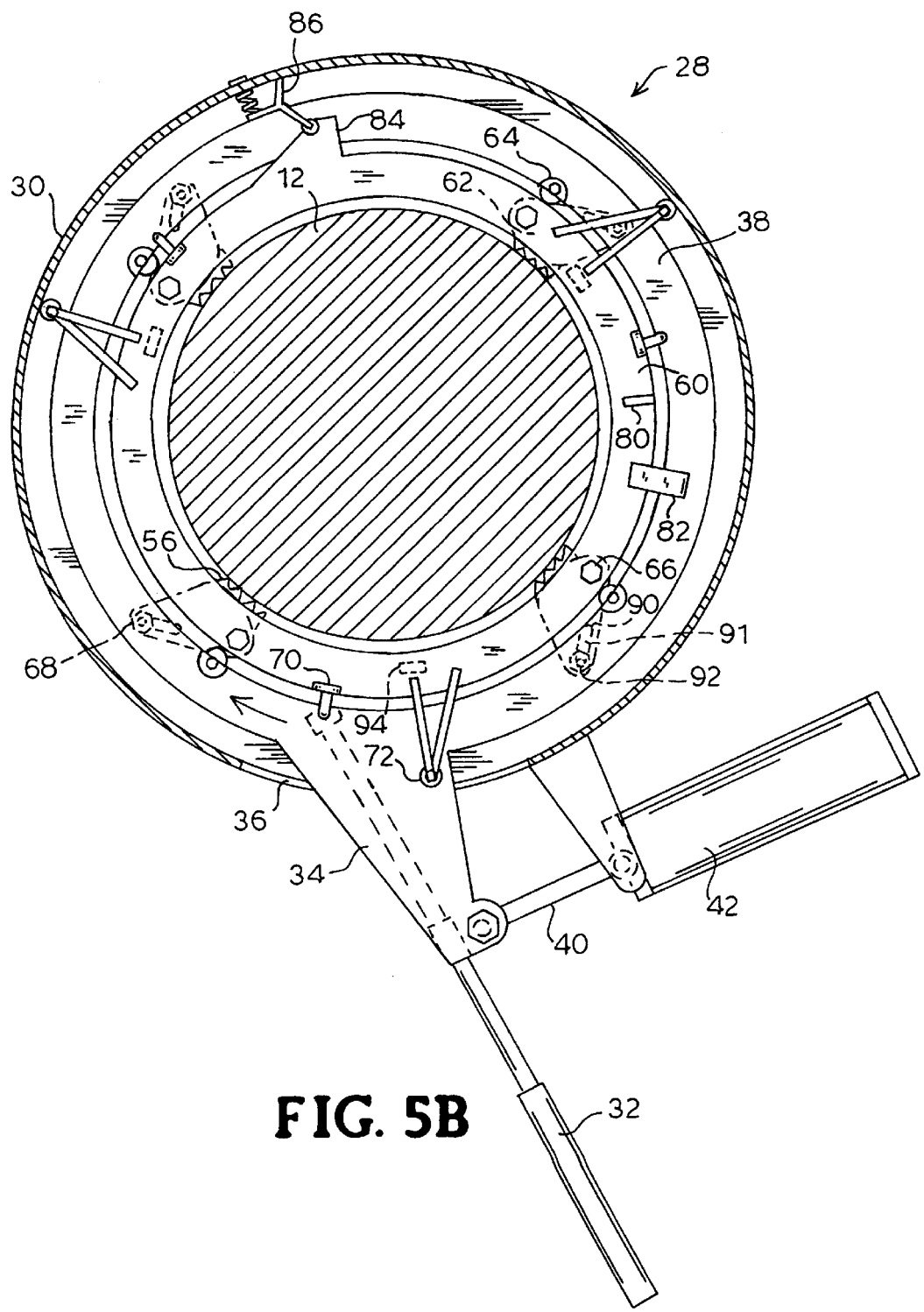
Figure 5C:
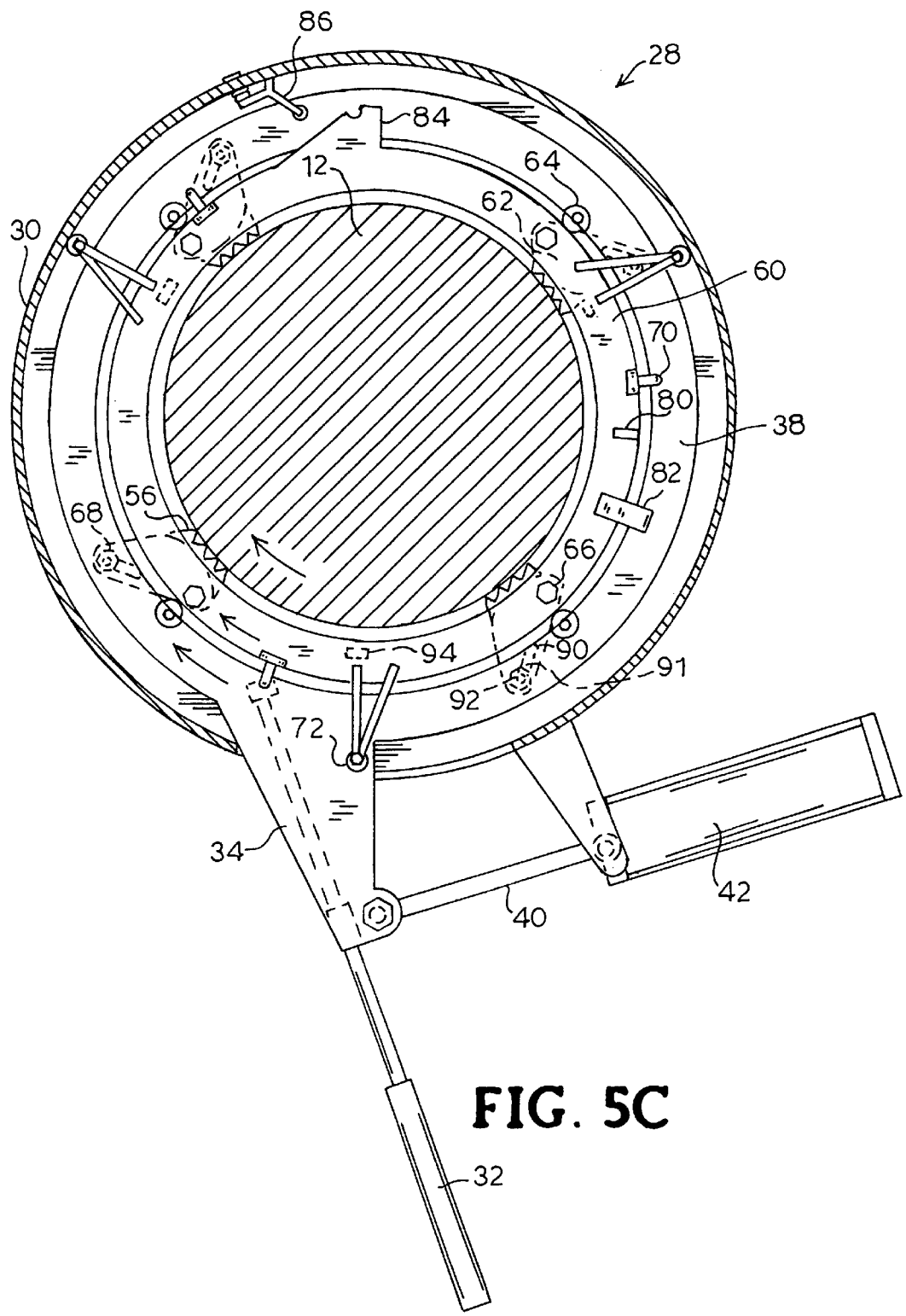
Figure 6:
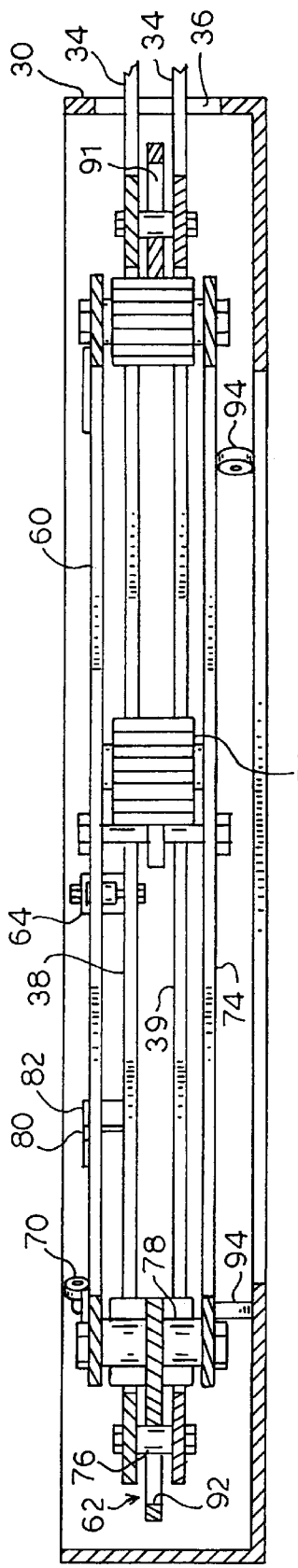

FIGS. 5a, 5b, and 5c depict a sequence of operation of the wrench 28. In FIG. 5a, the driver arms 34 are in their original, retracted position. The gripping face 56 of each pawl 62 is rotated away from the center of the housing 30 through which the electrode section 12 passes. The driver pin 68 through the slot 91 is at the end proximate 90 to the pivot point hole 88 on each pawl 62. The return finger 82 is adjacent to the return block 80. The driver arms 34 are attached to the piston 40 with a pin 31 that passes through the holes in the driver arms 34 and the eye at the end of the piston 40.

In the best mode of the present invention, the wrench 28 will be operated manually until the fit between the electrodes is tight by using the handle 32 with the pin 31 that connects the driver arms 34 to the piston 40 removed. Manual operation using the handle 32 is quicker than operation driven by the pneumatic cylinder 42. After the electrodes become tight, the pin 31 may be inserted to connect the driver arms 34 to the piston 40, and the pneumatic cylinder may be used to complete the turning of the new electrode section 12 and to reach the torque specified by the electrode manufacturer. FIGS. 5a, 5b, and 5c show the driver arms 34 connected to the piston 40.

In FIG. 5b the driver arms 34 are partially extended. The driver members 38, 39 (39 not visible) have turned in a clockwise direction to make the pawls 62 rotate to orient their gripping faces 56 to contact the electrode section 12. The driver pin 68 through the slot 91 moved to the end distal 92 to the pivot point hole 88 on each pawl 62. The coupler members 60, 74 (74 not visible) have not yet turned, and the lock 86 remains in the recessed portion of the stop 84, preventing turning of the coupler members prior to the pawls 62 rotating into position to grasp the electrode section 12. The electrode section 12 has not yet turned.

In FIG. 5c the driver arms 34 are fully extended. The gripping face 56 of each pawl 62 releasably grasps the electrode section 12. The driver members 38, 39 (39 not visible) have turned in the clockwise direction to cause the coupler members 60, 74 (74 not visible) to turn, thereby causing the electrode section 12 to turn. When the driver arms 34 reach the end of their stroke and begin to return to the retracted position shown in FIG. 5a, the driver members 38, 39 (39 not visible) rotate in the counterclockwise direction, causing the pawls 62 to rotate and the gripping, faces 56 to release the electrode section 12. The electrode section 12 does not turn in the counterclockwise direction. As the driver member 38 returns to the original, retracted position the return finger 82 that is connected to the driver member 38 contacts the return block 80, causing the coupler to return to the original position shown in FIG. 5a.

Although the invention has been shown and described with respect to a best mode embodiment thereof, it should be understood by those skilled in the art that various changes, omissions, and additions may be made to the form and detail of the disclosed embodiment without departing from the spirit and scope of the invention, as recited in the following claims.

What is claimed is:

1. Apparatus for use by an operator in tightening the threaded mounting, end of an axially extended, substantially cylindrical, free electrode section, to the threaded receiving end of a mounted electrode section, said apparatus comprising:

a housing, having a principal axis and being adapted to accept clear passage therethrough of the free electrode section in substantial axial alignment with said principal axis;

a coupler, having spaced apart first and second coupler members adapted to be fitted within said housing in vertical registration with each other and in concentric registration with said principal axis, each of said coupler members having a central aperture adapted to accept clear passage therethrough of the free electrodes section, said coupler further having a plurality of pawls disposed intermediate to said first and second coupler members in spaced relationship about the perimeter of said central apertures, each of said pawls having a gripping face, and each having a pivot point at one end and a slotted connection at another end thereof, the pivot point of each of said pawls being movably mounted between said first and second coupler members with coupler pins fixedly connecting said first and second coupler members and passing through each of said pivot points in a manner to allow said pawls to move about said pivot point, inwardly and outwardly of said central apertures; and a driver, having spaced apart first and second driver members adapted to be fitted within said housing in vertical registration with each other and in concentric registration with said principal axis, each of said driver members having a central aperture adapted to accept clear passage therethrough of the free electrode section, and each a having driver arm extending therefrom, said housing being adapted to accommodate the extension of said driver arms radially therefrom over an arc of travel, from a retracted to an extended position along said arc of travel, said driver members each being connected to said slotted connection of each of said pawls, said slotted connection of said pawls slidably mounted between said first and second driver members with driver pins fixedly connecting said first and second driver members and passing through each of said slotted connections, and said slotted connections each having one end proximate to the pivot point and another distal end;

whereby a force applied to said driver arms causes rotation of said driver about said principal axis from the retracted position through an arc of travel causing said slotted connection to move such that said driver pins are proximate to said distal end causing each of said pawls to rotate inwardly to said central aperture about each of said pivot points, causing said gripping faces to releasably engage the free electrode section and then causing said coupler to turn about said principal axis, causing the free electrode section to turn about said principal axis, until said driver arms are extended, and as said driver reaches the end of its arc of travel said slotted connection moves such that said driver pin is proximate to said pivot point end and said pawls rotate outwardly from the aperture to disengage said gripping face from the free electrode section and said driver arms are returned to the retracted position.

2. The apparatus according to claim 1, further comprising a means for applying force to said driver arms.

3. The apparatus according to claim 2, further comprising a handle adapted to be used in manual operation of said apparatus by connection to said driver arms.

4. The apparatus according to claim 2, further comprising a mechanical means for applying force to said driver arms.

5. The apparatus according to claim 4, wherein the mechanical means for applying force to said driver arms comprises a pneumatic cylinder.

6. The apparatus according to claim 4, wherein the mechanical means for applying force to said driver arms comprises an electric motor.

7. The apparatus according to claim 1, further comprising a means for preventing said coupler from turning in advance of said pawls being oriented with said gripping faces in contact with said free electrode section.

8. The apparatus according to claim 1, further comprising:
- a plurality of coupler centering bearings for centering said coupler within said housing;
- a plurality of driver horizontal bearings for centering said driver horizontally relative to said coupler;
- a plurality of driver vertical bearings for locating said driver vertically relative to said coupler; and
- a plurality of coupler vertical bearings that contact the bottom interior surface of said housing and locate the coupler vertically relative to said housing.

9. The apparatus according to claim 1, further comprising:
- a return finger attached to said driver; and
- a return block attached to said coupler, wherein said return finger contacts said return block causing said coupler to return to the its original position as the driver returns to the retracted position.

10. The apparatus according to claim 1, further comprising:
- a stand for supporting said housing; and
- lifting eyes attached to said housing adapted for attachment to a line or lines for lifting said apparatus.

11. The apparatus according to claim 1, wherein said housing is substantially cylindrical with a substantially annular shaped bottom and said driver members and coupler members arc substantially annular shaped.

12. The apparatus according to claim 1, wherein said housing, driver members, and coupler members are made of steel.

13. Apparatus for use by an operator in tightening the threaded mounting end of an axially extended, substantially cylindrical, free electrode section, to the threaded receiving end of a mounted electrode section, said apparatus comprising:
- a housing, having a principal axis and being adapted to accept clear passage therethrough of the free electrode section in substantial axial alignment with said principal axis, wherein said housing is substantially cylindrical with an annular shaped bottom;
- a coupler, substantially annular in shape, having spaced apart first and second coupler members adapted to be fitted within said housing in vertical registration with each other and in concentric registration with said principal axis, each of said coupler members having a central aperture adapted to accept clear passage therethrough of the free electrode section, said coupler further having a plurality of pawls disposed intermediate to said first and second coupler members in spaced relationship about the perimeter of said central apertures, each of said pawls having a gripping face, and each having a pivot point at one end and a slotted connection at another end thereof, the pivot point of each of said pawls being movably mounted between said first and second coupler members with coupler pins fixedly connecting said first and second coupler members and passing through each of said pivot points in a manner to allow said pawls to move about said pivot point, inwardly and outwardly of said central apertures;
- a driver, substantially annular in shape, having spaced apart first and second driver members adapted to be fitted within said housing in vertical registration with each other and in concentric registration with said principal axis, each of said driver members having a central aperture adapted to accept clear passage therethrough of the fire electrode section, and each a having driver arm extending therefrom, said housing being adapted to accommodate the extension of said driver arms radially therefrom over an arc of travel, from a retracted to an extended position along said arc of travel, said driver members each being connected to said slotted connection of each of said pawls, said slotted connection of said pawls slidably mounted between said first and second driver members with driver pins fixedly connecting said first and second driver members and passing through each of said slotted connections, and said slotted connections each having one end proximate to the pivot point and another distal end;
- a means for applying force to said driver arms;
- a means for preventing said coupler from turning in advance of said pawls being oriented with said gripping faces in contact with said free electrode section;
- a plurality of coupler centering bearings for centering said coupler within said housing;
- a plurality of driver horizontal bearings for centering said driver horizontally relative to said coupler;
- a plurality of driver vertical bearings for locating said driver vertically relative to said coupler;
- a plurality of coupler vertical bearings that contact the bottom interior surface of said housing and locate the coupler vertically relative to said housing;
- a return finger attached to said driver;
- a return block attached to said coupler, wherein said return finger contacts said return block causing said coupler to return to the its original position as the driver returns to the retracted position;
- a stand for supporting said housing; and
- lifting eyes attached to said housing adapted for attachment to a line or lines for lifting said apparatus;
- whereby a force applied to said driver arms causes rotation of said driver about said principal axis from the retracted position through an arc of travel causing said slotted connection to move such that said driver pins are proximate to said distal end causing each of said pawls to rotate inwardly to said central aperture about each of said pivot points, causing said gripping faces to releasably engage the free electrode section and then causing said coupler to turn about said principal axis, causing the free electrode section to turn about said principal axis, until said driver arms are extended and as said driver reaches the end of its arc of travel said slotted connection moves such that said driver pin is proximate to said pivot point end and said pawls rotate outwardly from the aperture to disengage said gripping face from the free electrode section and said driver arms are returned to the retracted position.

* * * * *

UNITED STATES PATENT AND TRADEMARK OFFICE
CERTIFICATE OF CORRECTION

PATENT NO. : 6,167,076
DATED : December 26, 2000
INVENTOR(S) : Rey Mupas Ignacio It is certified that error appears in the above-identified patent and that said Letters Patent is hereby corrected as shown below:

Title page
Item [75], Inventor, change "N.C.", to -- S.C. --.

Column 1,
Line 23, change "4.500", to -- 4,500 --.

Column 2,
Line 52, after "invention", insert -- , --.
Line 56, after "torque", insert -- , --.

Column 3,
Line 20, after "FIG. 4", delete -- : --.

Column 5,
Line 46, after "gripping", delete -- , --.
Line 62, after "mounting", delete -- , --.

Column 6,
Line 6, change "electrodes", to -- electrode --.
Line 26, change "a having", to -- having a --.

Column 7,
Line 29, change "arc", to -- are --.

UNITED STATES PATENT AND TRADEMARK OFFICE
CERTIFICATE OF CORRECTION

PATENT NO. : 6,167,076
DATED : December 26, 2000
INVENTOR(S) : Rey Mupas Ignacio It is certified that error appears in the above-identified patent and that said Letters Patent is hereby corrected as shown below:

Column 8,
Line 7, change "fire", to -- free --.
Line 52, after "extended", insert -- , --.

Signed and Sealed this

Fourteenth Day of May, 2002

*Attest:*

JAMES E. ROGAN
*Attesting Officer*  *Director of the United States Patent and Trademark Office*